United States Patent
Benton et al.

(10) Patent No.: US 7,653,823 B2
(45) Date of Patent: Jan. 26, 2010

(54) METHOD AND APPARATUS FOR INFORMING COMPUTER OF POWER ENVIRONMENT

(75) Inventors: Farrel David Benton, Raleigh, NC (US); Shane Christopher Branch, Raleigh, NC (US); Robert James Kapinos, Durham, NC (US); Raymond Gary Octaviano, II, Durham, NC (US); Richmond Andrew Real, Raleigh, NC (US); James Stephen Rutledge, Durham, NC (US); Alberto José Rojas Saba, Morrisville, NC (US); James C. Salembier, Cary, NC (US); Simon David Nicholas Taylor, Cary, NC (US); Sean Michael Ulrich, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 459 days.

(21) Appl. No.: 11/384,464

(22) Filed: Mar. 20, 2006

(65) Prior Publication Data

US 2007/0220286 A1 Sep. 20, 2007

(51) Int. Cl.
*G06F 1/26* (2006.01)
(52) U.S. Cl. .................... 713/300; 713/340
(58) Field of Classification Search ............ 713/300, 713/340, 320
See application file for complete search history.

(56) References Cited

U.S. PATENT DOCUMENTS

| | | | |
|---|---|---|---|
| 5,289,046 A | 2/1994 | Gregorich et al. | 307/66 |
| 5,420,496 A * | 5/1995 | Ishikawa | 320/106 |
| 5,587,916 A | 12/1996 | Martinson et al. | 364/483 |
| 5,859,522 A * | 1/1999 | Theobald | 320/106 |
| 5,884,233 A | 3/1999 | Brown | 702/61 |
| 5,933,847 A * | 8/1999 | Ogawa | 711/103 |
| 6,054,846 A | 4/2000 | Castleman | 323/283 |
| 6,204,637 B1 * | 3/2001 | Rengan | 320/137 |
| 6,445,086 B1 | 9/2002 | Houston | 307/24 |
| 6,459,175 B1 | 10/2002 | Potega | 307/149 |
| 6,538,341 B1 | 3/2003 | Lang | 307/18 |
| 6,597,565 B1 * | 7/2003 | Kluth et al. | 361/679 |
| 6,828,760 B2 * | 12/2004 | Massey et al. | 320/127 |
| 6,885,952 B1 | 4/2005 | Hayes | 702/64 |
| 7,168,150 B2 * | 1/2007 | Eckstein et al. | 29/593 |
| 7,243,246 B2 * | 7/2007 | Allen et al. | 713/300 |
| 7,392,410 B2 * | 6/2008 | Allen et al. | 713/310 |
| 7,453,171 B2 * | 11/2008 | Lanni | 307/151 |
| 7,554,218 B2 * | 6/2009 | DuBose et al. | 307/10.1 |
| 2002/0180277 A1 | 12/2002 | Acharya et al. | 307/140 |
| 2004/0113496 A1 | 6/2004 | Nguyen | 307/66 |
| 2005/0102043 A1* | 5/2005 | Menas et al. | 700/22 |
| 2006/0015757 A1* | 1/2006 | Tupman et al. | 713/300 |
| 2006/0098358 A1* | 5/2006 | Wambsganss et al. | 361/18 |
| 2007/0024239 A1* | 2/2007 | Park | 320/114 |

* cited by examiner

*Primary Examiner*—Chun Cao
(74) *Attorney, Agent, or Firm*—John L. Rogitz

(57) ABSTRACT

A power adaptor for a computer discovers the power environment when it is plugged into a socket and sends a signal to the computer along the power line indicating the environment, so that the computer can configure operations accordingly.

10 Claims, 2 Drawing Sheets

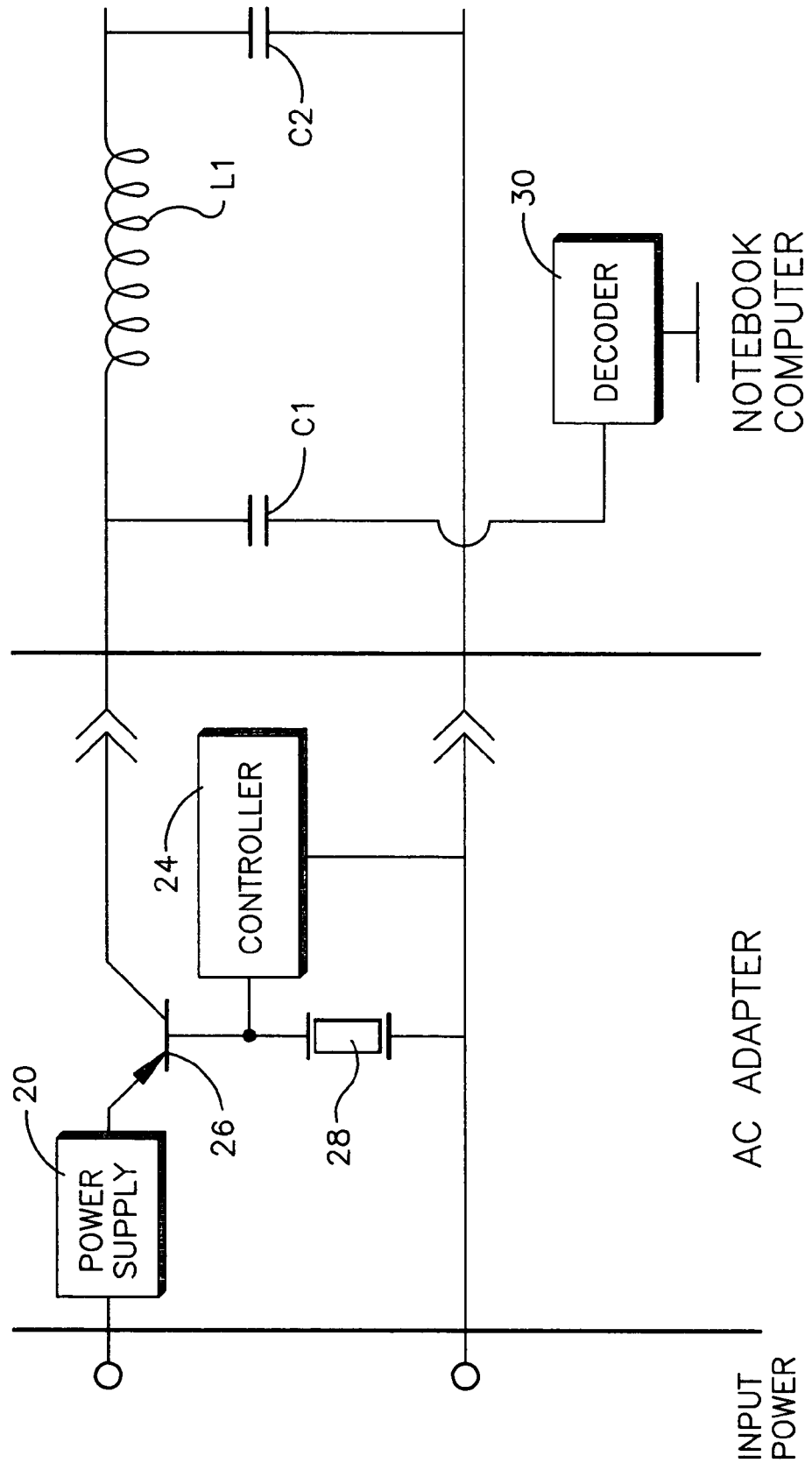

METHOD AND APPARATUS FOR INFORMING COMPUTER OF POWER ENVIRONMENT

FIELD OF THE INVENTION

The present invention relates generally to methods and apparatus for informing computers of the power environment.

BACKGROUND OF THE INVENTION

Mobile computers can be used in various power environments, e.g., in a car, in an office, on an airplane, etc. Accordingly, computers come equipped with power adapters that can be plugged into sockets on the wall of an office, the bulkhead of an airplane, the cigarette lighter of a car, etc. to power the computers and thereby save battery life for times when no socket is available.

As understood herein, in each of these examples uniform power is not provided to the computer, because the power available from a plane, for instance, does not match the power available from an office wall socket. For instance, many laptop computers ordinarily draw ninety watts, but an airplane power system may be designed to supply only seventy five watts. Under these circumstances, the present invention recognizes the desirability of informing the computer about the power environment in which it finds itself, so the computer can tailor its own operations accordingly.

SUMMARY OF THE INVENTION

A system includes a computer and a power adapter connectable to the computer to supply power to the computer. The adapter is configured to engage an outlet of a power supply, and the adapter sends a signal to the computer indicating the type of the power supply.

In non-limiting implementations the adapter supplies power to the computer over a power line, and the signal is sent over the power line. The signal can have a frequency that is correlated to the type of power supply, with different frequencies indicating different power supplies. In one non-limiting embodiment the adapter generates the signal by toggling a transistor. The adapter may determine power supply type at least in part based on a voltage input to the adapter, and the computer may establish a power mode in response to the signal indicating the type of the power supply.

In another aspect, a method includes using an adapter to convert power from a source into a demanded dc power to power a computer. The adapter is also used to send information to the computer related to the type of source that the source is.

In still another aspect, a system includes an adapter with means for converting ac power to dc power for use thereof by a computer. The adapter also includes means for signaling information to the computer. The information is useful to cause the computer to assume an operating state based on the type of source of power.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is circuit diagram of a non-limiting implementation of the adapter and computer.

DETAILED DESCRIPTION OF THE PREFERRED EMBODIMENT

Figure 1:
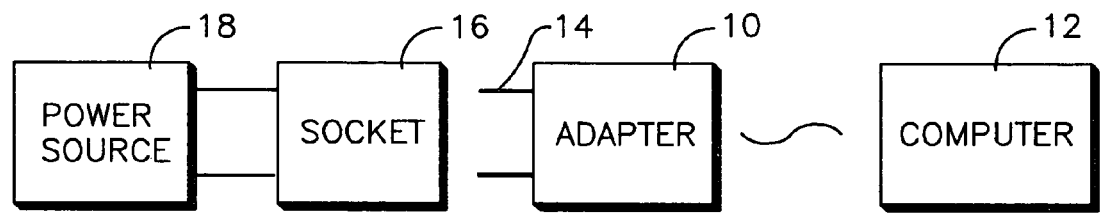
FIG. 1 is a block diagram of the present system.

Referring initially to FIG. 1, a power adapter 10 is shown that is electrically connectable to a computer 12 such as a laptop for supplying the computer 12 with dc power that has been rectified from an ac source. More particularly, the adapter 10 may include one, two, three or more prongs 14 that are configured to engage respective receptacles in a socket 16, and the socket 16 is electrically connected to an ac power source 18, so that the adapter 10 converts the ac voltage from the power source 18 to a dc voltage as required by the computer 12.

FIG. 2 shows a non-limiting implementation of the adapter 10, along with non-limiting components of the computer 12 for illustration. The components of the adapter 10 shown in FIG. 2 may be enclosed in a single hollow housing.

As shown, the adapter 10 receives power from an AC or in some cases DC power supply. The adapter 10 steps the voltage down to a demanded DC voltage regardless of input current type in accordance with power supply adapter principles known in the art. To this end, a power supply 20 can be provided to output the demanded DC power to the computer 12 along one or more power lines 22. Various coupling capacitors C1, C2 and an inductor L1 may be provided in the computer 12 as non-limiting examples of components that can be used to separate the AC signal from DC power consistent with principles known in the art.

The adapter 10 can include a controller 24 or other processor that controls a signaling element such as a non-limiting transistor 26 in accordance with principles set forth further below. As shown, the transistor 26 and a resistor 28 may be placed in series between two of the power lines 22. A decoder 30 in the computer 12 is provided as shown for purposes to be shortly disclosed.

Figure 3:
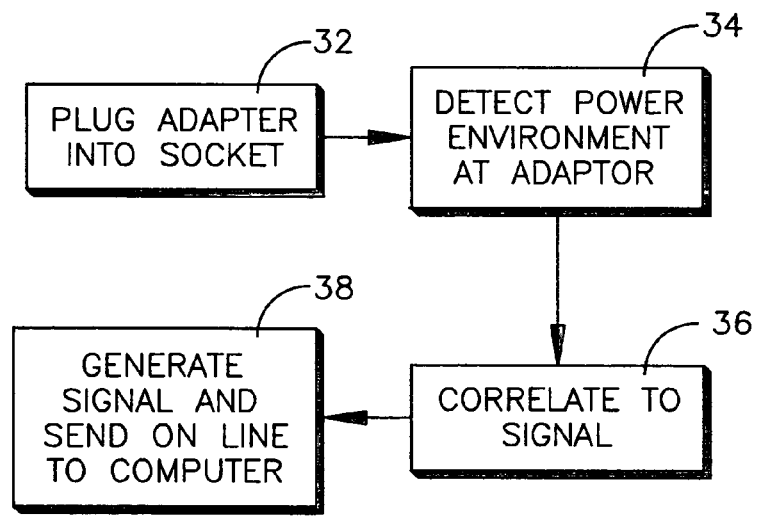
FIG. 3 is a flow chart showing the logic of the present invention.

FIG. 3 shows the present logic. Commencing at block 32, the adaptor 12 is plugged into the socket 16, and at block 34 the environment of the ac power source 18 is detected. With more particularity, at block 34 the controller 24 of the adapter 10 detects one or more characteristics of the power source 20, e.g., its voltage, directly-measured power capabilities, type or genre, etc. To this end, the controller receives an appropriate signal from the input.

Block 36 indicates that the controller 24 correlates the detected characteristic to a signal. For example, if the controller 24 determines that the power source 18 has a particular voltage (indicating, e.g., that the power source 18 is an aircraft power source), then the voltage is correlated to a frequency. Different voltages may be correlated to different frequencies, so that a first detected ac input voltage might be correlated to a lower frequency and a second detected ac input voltage might be correlated to a relatively higher frequency. In this way, the controller 24 is programmed to in essence correlate power source types to signals, such as might be characterized by frequencies or by some other parameter.

At block 38, the signal is generated and sent along the power line(s) 22. In the non-limiting implementation shown in FIG. 2, this can be done by the controller 24 by toggling the state of the transistor 26 at the frequency determined at block 36. The decoder 30 of the computer 12 can detect the frequency and correlate it to power source type, so that the computer 12 can tailor its operations accordingly. For example, if the signal from the adapter 10 indicates a relatively limited power source, the computer 12 may operate in a low power mode, where certain tasks or applications are not conducted or are abbreviated.

While the particular METHOD AND APPARATUS FOR INFORMING COMPUTER OF POWER ENVIRONMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A system, comprising:
    a computer;
    at least one power adapter connectable to the computer to supply power thereto, the adapter being configured to engage an outlet of a power supply, the adapter sending a signal to the computer indicating the type of the power supply, wherein the signal has a frequency correlated to the type of AC power supply, with different frequencies indicating different AC power supplies.

2. The system of claim 1, wherein the adapter supplies power to the computer over a power line, and the signal is sent over the power line.

3. The system of claim 1, wherein the adapter generates the signal by toggling at least one transistor.

4. The system of claim 1, wherein the outlet is an electrical socket.

5. The system of claim 1, wherein the adapter determines power supply type at least in part based on a voltage input to the adapter.

6. The system of claim 1, wherein the computer establishes a power mode in response to the signal indicating the type of the power supply.

7. A method, comprising:
    using an adapter to convert power from a source into a demanded dc power to power a computer; and
    using the adapter to send information to the computer related to the type of source that the source is wherein the adapter sends a signal to the computer indicating the type of the power supply, wherein the adapter generates the signal by toggling at least one transistor.

8. The method of claim 7, wherein the signal has a frequency correlated to the type of power supply, with different frequencies indicating different power supplies.

9. The method of claim 7, wherein the adapter determines power supply type at least in part based on a voltage input to the adapter.

10. The method of claim 7, wherein the computer establishes a power mode in response to the signal indicating the type of the power supply.

* * * * *

UNITED STATES PATENT AND TRADEMARK OFFICE
CERTIFICATE OF CORRECTION

PATENT NO. : 7,653,823 B2 Page 1 of 1
APPLICATION NO. : 11/384464
DATED : January 26, 2010
INVENTOR(S) : Benton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 732 days.

Signed and Sealed this

Twenty-third Day of November, 2010

David J. Kappos
*Director of the United States Patent and Trademark Office*